(12) United States Patent  (10) Patent No.: US 9,104,533 B2
Li et al.  (45) Date of Patent: Aug. 11, 2015

(54) VOLTAGE AND TIMING CALIBRATION METHOD USED IN MEMORY SYSTEM

(71) Applicant: MONTAGE TECHNOLOGY (SHANGHAI) CO., LTD., Shanghai (CN)

(72) Inventors: Chunyi Li, Shanghai (CN); Qingjiang Ma, Shanghai (CN)

(73) Assignee: MONTAGE TECHNOLOGY (SHANGHAI) CO., LTD., Shanghai (CN)

( * ) Notice: Subject to any disclaimer, the term of this patent is extended or adjusted under 35 U.S.C. 154(b) by 209 days.

(21) Appl. No.: 13/715,555

(22) Filed: Dec. 14, 2012

(65) Prior Publication Data

US 2013/0166870 A1   Jun. 27, 2013

(30) Foreign Application Priority Data

Dec. 27, 2011   (CN) .......................... 2011 1 0443575

(51) Int. Cl.
G06F 12/00 (2006.01)
G06F 13/16 (2006.01)
G06F 12/02 (2006.01)

(52) U.S. Cl.
CPC ............ *G06F 12/00* (2013.01); *G06F 13/1689* (2013.01); *G06F 12/023* (2013.01)

(58) Field of Classification Search
None
See application file for complete search history.

(56) References Cited

U.S. PATENT DOCUMENTS

| 2007/0073506 A1* | 3/2007 | Boskovic ...................... 702/107 |
| 2013/0083611 A1* | 4/2013 | Ware et al. ..................... 365/191 |
| 2014/0129870 A1* | 5/2014 | Lee et al. ...................... 713/601 |

\* cited by examiner

*Primary Examiner* — Brian Peugh
(74) *Attorney, Agent, or Firm* — Oliff PLC

(57) ABSTRACT

A voltage and timing calibration method used in a memory system. A memory controller adjusts timing and voltages of the controller and voltages of a memory buffer according to data returned by the buffer based on timing and voltages at a memory controller side of the buffer, to calibrate timing and voltages between the controller and controller side. According to data read by the buffer from a memory chip unit on the basis of timing and voltages at a memory chip side of the buffer, the controller adjusts the timing and voltage at the chip side and the voltage of the chip unit; or the buffer adjusts the timing and voltage at the chip side and the voltage of the chip unit, to calibrate the timing and voltage between the chip side and chip unit. Therefore, hardware resources of the buffer can be saved and the circuit can be simplified.

18 Claims, 7 Drawing Sheets

VOLTAGE AND TIMING CALIBRATION METHOD USED IN MEMORY SYSTEM

BACKGROUND OF THE PRESENT INVENTION

1. Field of Invention

The present invention relates to the field of memories, and specifically to a voltage and timing calibration method used in a memory system.

2. Description of Related Arts

In an existing memory system, in order to reduce the loading of a memory controller and improve work timing, a memory buffer for buffering commands, addresses and data is generally set in a memory module. For example, in a memory system shown in FIG. 1, a fully buffer for buffering control signals and data signals in one is disposed, in which the fully buffer is connected in a communication manner to a memory controller and multiple memory chip units respectively. Still for example, in a memory system shown in FIG. 2, a control buffer for buffering control signals and data buffer for buffering data signals are disposed.

For a memory system disposed with any memory buffer, due to a low voltage (a supply voltage VDD≤1.5V) and a high speed (800-2133 Mbps) in operation, before a normal operation of the memory system, it is required to first calibrate timing and the voltage of the interfaces between the memory controller and the memory buffer, and between the memory buffer and each memory chip unit. In an existing process of calibrating the timing and the voltage, the memory buffer first sends control instructions, write timing and write data for the calibration, and adjusts timing and voltages at memory chips side of the memory buffer according to the data feedback from each memory chip, so as to implement calibration of the timing and the voltage between the memory chip side of the memory buffer and each memory chip. Afterwards, the memory controller sends the control instructions, the write timing and the write data for the calibration, and adjusts timing and voltages of the memory controller according to data feedback from the memory buffer, so as to implement calibration of the timing and the voltage between the memory controller and the memory controller side of the memory buffer. The calibration of the timing and the voltage between the memory buffer and each memory chip unit is first performed, so a signal generation unit for generating the control instructions, write timing and write data for calibration, and a timing and voltage calibration unit need to be disposed in the memory buffer. As shown in FIG. 1, likewise, a signal generation unit for generating the control instruction, write timing and write data for calibration, and a timing and voltage calibration unit also need to be disposed in the memory controller.

The signal generation unit for generating the control instructions, write timing and write data for calibration in the memory controller generally may be implemented by using a Basic Input/Output System (BIOS) (that is, a software manner), so that the design for the memory controller is simple and highly flexible. However, if the signal generation unit for generating the control instruction, write timing and write data for calibration in the memory buffer is also implemented in the software manner, a dedicated micro-processor needs to be disposed in the memory buffer. The dedicated micro-processor has simple functions but needs to output many control signals, resulting in complicated design, and further directly causing great increase in the cost. If pure hardware is used for the implementation, the circuit design for the memory buffer becomes complicated. Moreover, if problems are discovered after testing the manufactured memory buffer chip, the memory buffer chip needs to be re-designed and then manufactured, which prolongs the whole cycle of the memory buffer from design to pilot production, then to test, and finally to mass production.

Therefore, it is extremely necessary to improve the existing timing and voltage calibration method.

SUMMARY OF THE PRESENT INVENTION

In view of the above disadvantages in the prior art, an objective of the present invention is to provide a voltage and timing calibration method used in a memory system, so as to simplify the circuit of the memory buffer.

To achieve the above objective and other relevant objectives, the present invention provides a voltage and timing calibration method used in a memory system, wherein the memory system comprises a memory controller, at least one memory buffer connected to the memory controller in a communication manner, and at least one memory chip unit connected to the memory buffer in a communication manner. The voltage and timing calibration method used in the memory system at least includes the following steps: 1) the memory controller adjusting timing and voltages of the memory controller and a write voltage of the memory buffer according to data returned by the memory buffer on the basis of timing and a voltage at a memory controller side of the memory buffer, so as to implement calibration of the timing and the voltage between the memory controller and the memory controller side of the memory buffer; and 2) according to data read from the memory chip unit by the memory buffer undergone the calibration of the timing and the voltage at the memory controller side on the basis of the timing and the voltage at a memory chip side of the memory buffer, the memory controller adjusting read/write timing and a read voltage at the memory chip side of the memory buffer, and a write voltage of the memory chip unit, so as to implement calibration of the timing and the voltage between the memory chip side of the memory buffer and the memory chip unit connected in a communication manner; or the memory buffer undergone the calibration of the timing and the voltage at the memory controller side adjusting read/write timing and a read voltage at a memory chip side of the memory buffer, and a write voltage of the memory chip unit according to data read from the memory chip unit on the basis of the timing and the voltage at a memory chip side of the memory buffer, so as to implement calibration of the timing and the voltage between the memory chip side of the memory buffer and the memory chip unit connected in a communication manner.

Preferably, step 1) comprises the following sub-steps:

the memory buffer sending first preset data to the memory controller on the basis of a first communication instruction from the memory controller and according to read timing and a read voltage at the memory controller side of the memory buffer; and the memory controller comparing first preset data of the memory controller with the first preset data read from the memory buffer on the basis of the read timing and the read voltage of the memory controller to determine read timing and the read voltage of the memory controller, so as to implement calibration of the read timing and the read voltage between the memory controller and the memory controller side of the memory buffer.

Preferably, step 1) comprises the following sub-steps:

the memory controller sending a second communication instruction to the memory buffer undergone the calibration of the read timing and the read voltage at the memory controller side, and then sending the first write acquisition signal on the basis of write timing and a write voltage of the memory controller, so that the memory buffer undergone the calibration of the read timing and the read voltage at the memory controller side samples the clock signal of the memory buffer on the basis of the received first write acquisition signal so as to obtain a first sampling signal, and returns the first sampling signal to the memory controller; and on the basis of the first sampling signal from the memory buffer, the memory controller adjusting timing of the write acquisition signal sent from the memory controller to the memory buffer, so as to align the write acquisition signal sent from the memory controller to the memory buffer with the clock signal of the memory buffer.

Preferably, step 1) comprises the following sub-steps:

the memory controller sending a third communication instruction to the memory buffer undergone the alignment of the clock signal and the write acquisition signal from the memory controller, and then sending first write data on the basis of write timing and a write voltage of the memory controller, so that the memory buffer undergone the alignment of the clock signal and the write acquisition signal from the memory controller writes the first write data from the memory controller into a storage unit of the memory buffer according to the write timing and write voltage at the memory controller side of the memory buffer, and afterwards sends back the first write data written into the storage unit to the memory controller; and the memory controller adjusting write timing of the memory controller and a write voltage of the memory buffer by comparing the first write data from the memory buffer with the first write data sent from the memory controller to the memory buffer, so as to implement calibration of the write timing and the write voltage between the memory controller and the memory controller side of the memory buffer.

Preferably, step 2) comprises the following sub-steps:

a memory chip unit connected in a communication manner to the memory buffer undergone the calibration of the write timing and the write voltage at the memory controller side returning a preset acquisition signal to the memory buffer on the basis of a fourth communication instruction and according to read timing and a read voltage of the memory chip unit; and the memory buffer reading the preset acquisition signal from the memory chip unit on the basis of the read timing and the read voltage at the memory chip side of the memory buffer, and adjusting, on the basis of the read preset acquisition signal, an initiation point of a read enable signal at the memory chip side of the memory buffer, so that the read enable signal covers the acquisition signal from the memory chip unit; or the memory controller adjusting an initiation point of a read enable signal at the memory chip side of the memory buffer according to the preset acquisition signal read from the memory chip unit by the memory buffer on the basis of the read timing and read voltage at the memory chip side of the memory buffer, so that the read enable signal covers the acquisition signal from the memory chip unit.

Preferably, step 2) comprises the following sub-steps:

a memory chip unit connected in a communication manner to the memory buffer undergone the initiation point adjustment of the read enable signal returning second preset data to the memory buffer on the basis of a fifth communication instruction and according to the read timing and the read voltage of the memory chip unit; and the memory controller comparing the second preset data of the memory controller with the second preset data read from the memory chip unit by the memory buffer undergone the initiation point adjustment of the read enable signal on the basis of the read timing and the read voltage at the memory chip side of the memory buffer, and adjusting the read timing and the read voltage at the memory chip side of the memory buffer according to the comparison result, so as to implement calibration of the read timing and the read voltage between the memory chip side of the memory buffer and the memory chip unit; or the memory buffer undergone the initiation point adjustment of the read enable signal comparing the second preset data of the memory buffer with the second preset data read from the memory chip unit on the basis of the read timing and the read voltage at the memory chip side of the memory buffer, and adjusting the read timing and the read voltage at the memory chip side of the memory buffer according to the comparison result, so as to implement calibration of the read timing and the read voltage between the memory chip side of the memory buffer and the memory chip unit.

Preferably, step 2) comprises the following sub-steps:

the memory chips unit connected in a communication manner to the memory buffer undergone the calibration of the read timing and the read voltage at the memory chip side sampling the clock signal of the memory chip unit on the basis of a sixth communication instruction and send a second write acquisition signal from the memory buffer, so as to obtain a second sampling signal and return the second sampling signal to the memory buffer, and the memory buffer sending the second sampling signal from the memory chip unit to the memory controller on the basis of the read timing and the read voltage at the memory chip unit side of the memory buffer; and the memory controller adjusting timing of the write acquisition signal sent from the memory buffer to the memory chip unit on the basis of the second sampling signal from the memory buffer, so as to align the write acquisition signal sent from the memory buffer to the memory chip unit with the clock signal of the memory chip unit.

Preferably, step 2) comprises the following sub-steps:

the memory buffer undergone the alignment of the write acquisition signal and the clock signal of the memory chip unit sending second write data from the memory controller to the memory chip unit connected in a communication manner on the basis of a seventh communication instruction and according to the write timing and the write voltage at the memory chip side of the memory buffer, so that the memory chip unit writes the second write data into a storage unit of the memory chip unit according to the write timing and the write voltage of the memory chip unit, and afterwards, returns the second write data written into the storage unit to the memory buffer on the basis of the read timing and the read voltage of the memory chip unit, so that the memory buffer returns the second write data to the memory controller;

the memory controller adjusting write timing at the memory chip side of the memory buffer and the write voltage of the memory chip unit by comparing the second write data from the memory buffer with the second write data sent from the memory controller to the memory buffer, so as to implement calibration of the write timing and the write voltage between memory chip side of the memory buffer and the memory chip unit.

To sum up, through the voltage and timing calibration method used in the memory system, after completing the calibration of the timing and the voltage between the memory controller and the memory controller side of the memory buffer, the calibration of the timing and the voltage between the memory buffer and the memory chip unit is controlled on the basis of the memory controller, which can partially even fully save the signal generation unit conventionally disposed in the memory buffer, thereby effectively saving hardware resources of the memory buffer and simplifying the circuit of the memory buffer.

DETAILED DESCRIPTION OF THE PREFERRED EMBODIMENTS

The implementation of the present invention is described in the following through specific examples, and persons skilled in the art can easily understand other advantages and effects of the present invention through the content disclosed in the specification. The present invention may also be executed or applied through other different examples, modifications and variations may be made to the details in the specification on the basis of different opinions and applications without departing from the principle of the present invention.

Figure 1:
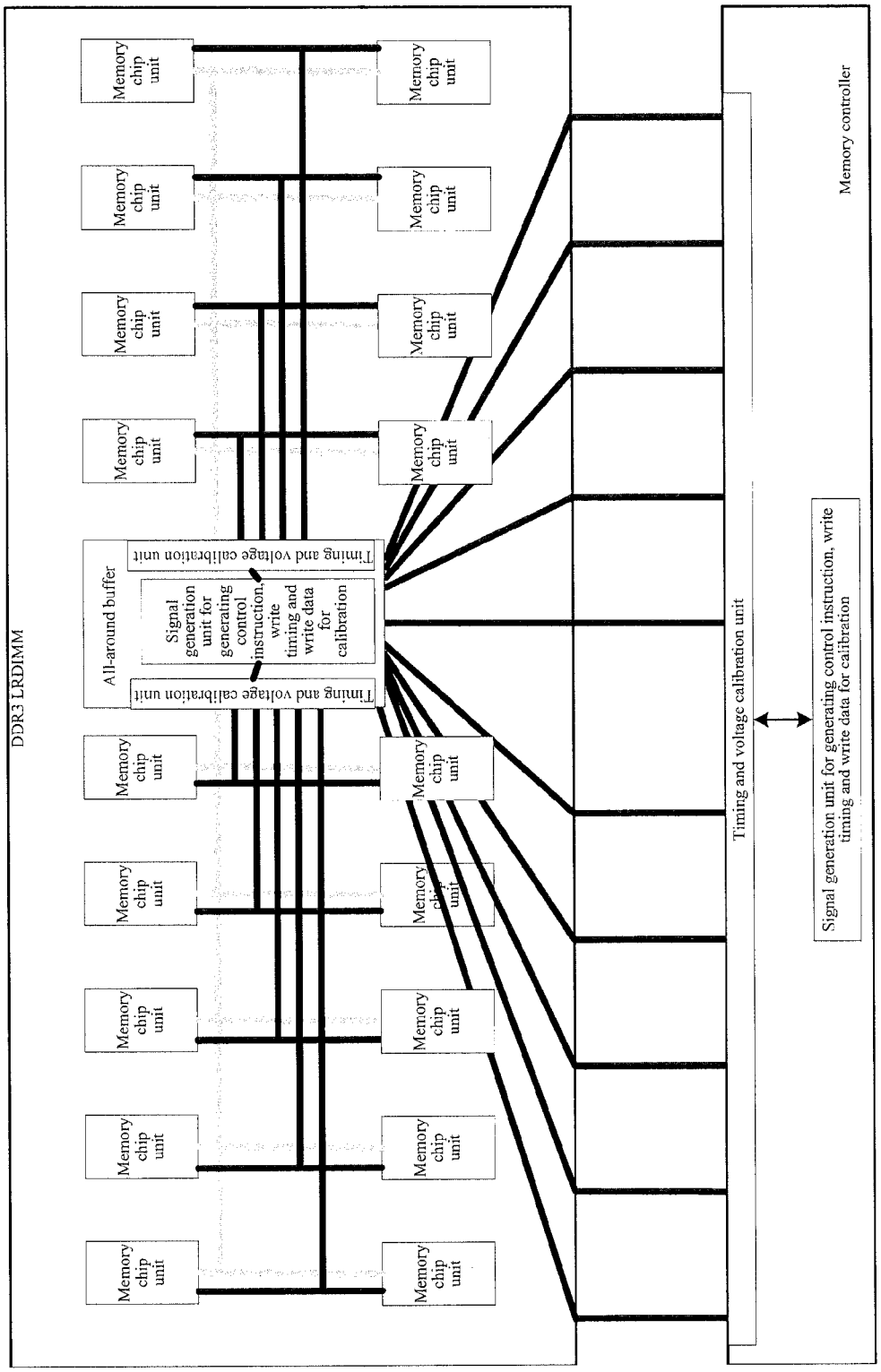
FIG. 1 is a schematic view illustrating a memory system in the prior art.
Figure 2:
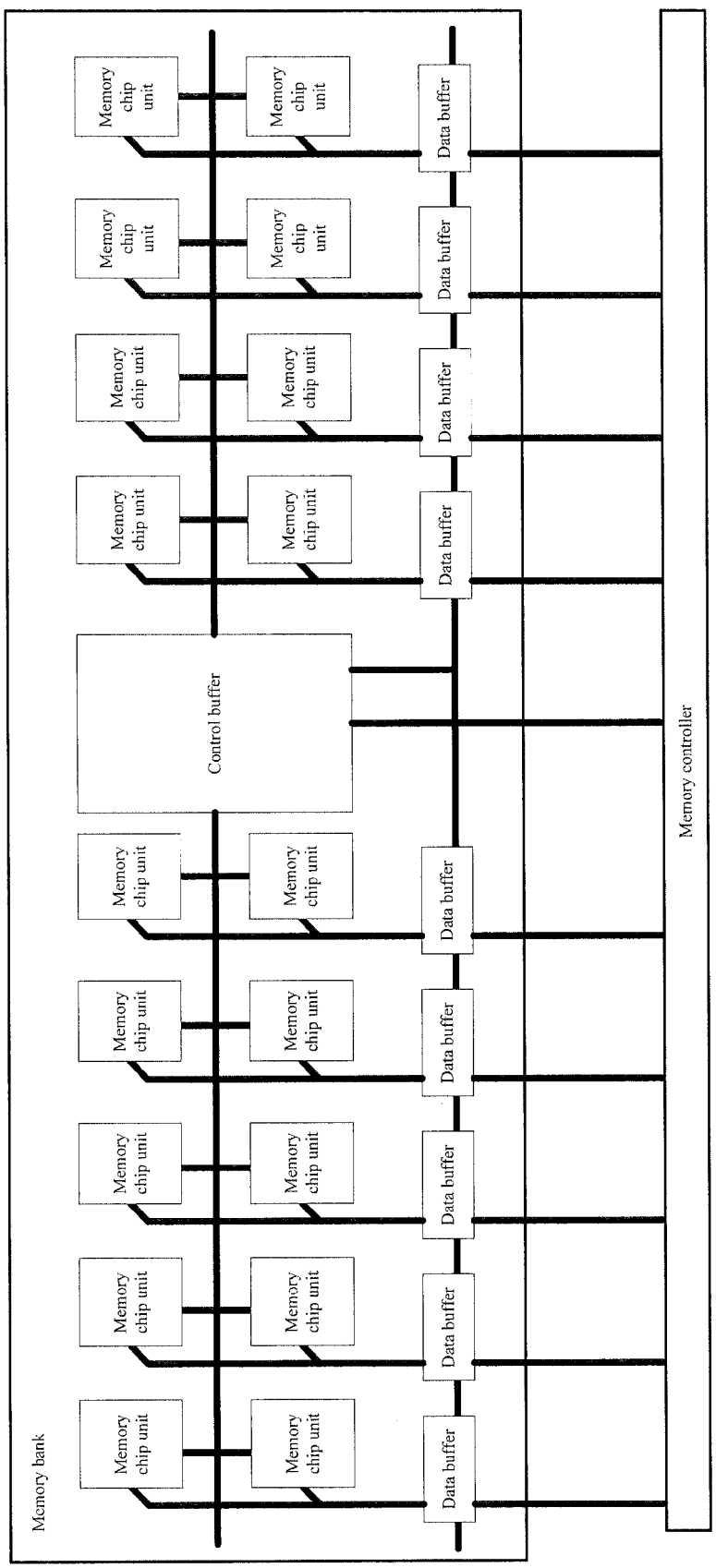
FIG. 2 is a schematic view illustrating another memory system in the prior art.
Figure 3:
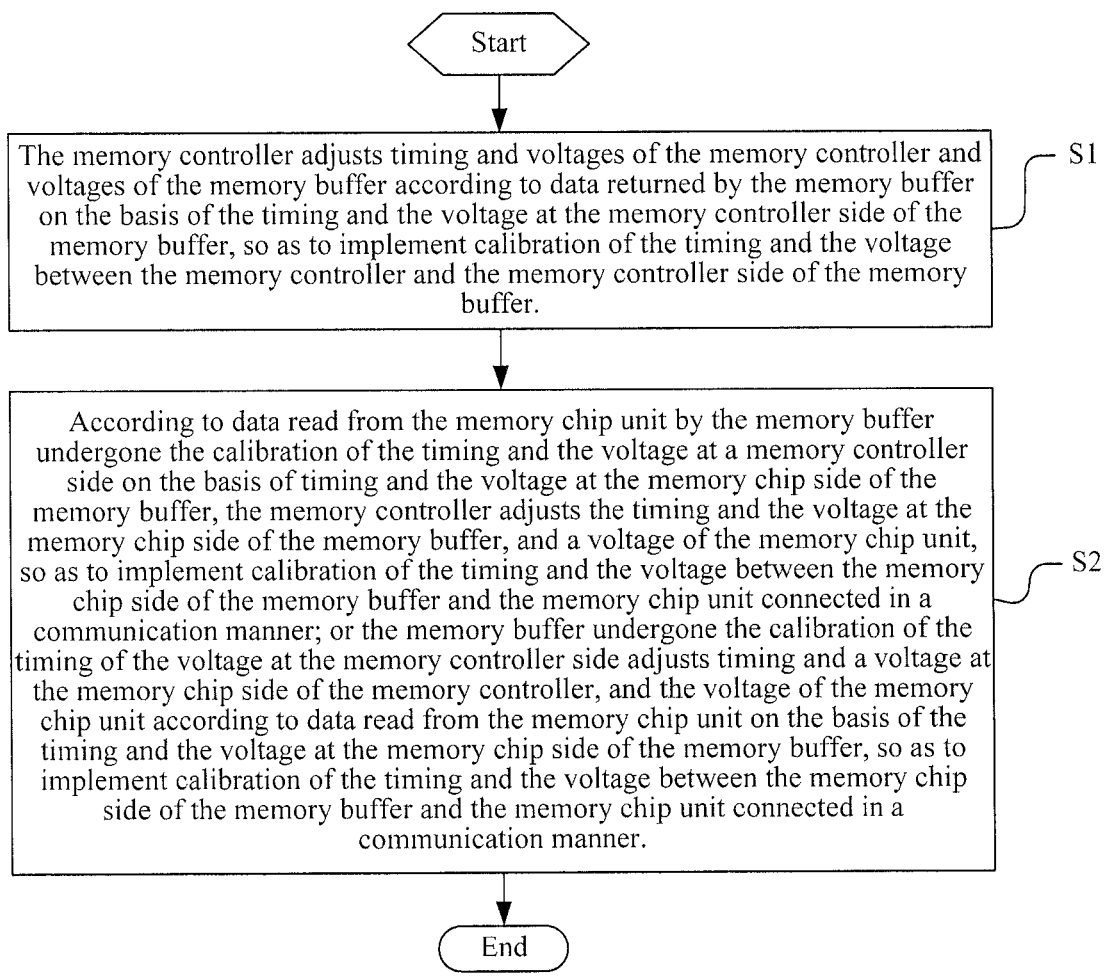
FIG. 3 is a flow chart of a voltage and timing calibration method used in a memory system consistent with the present invention.
Figure 4A:
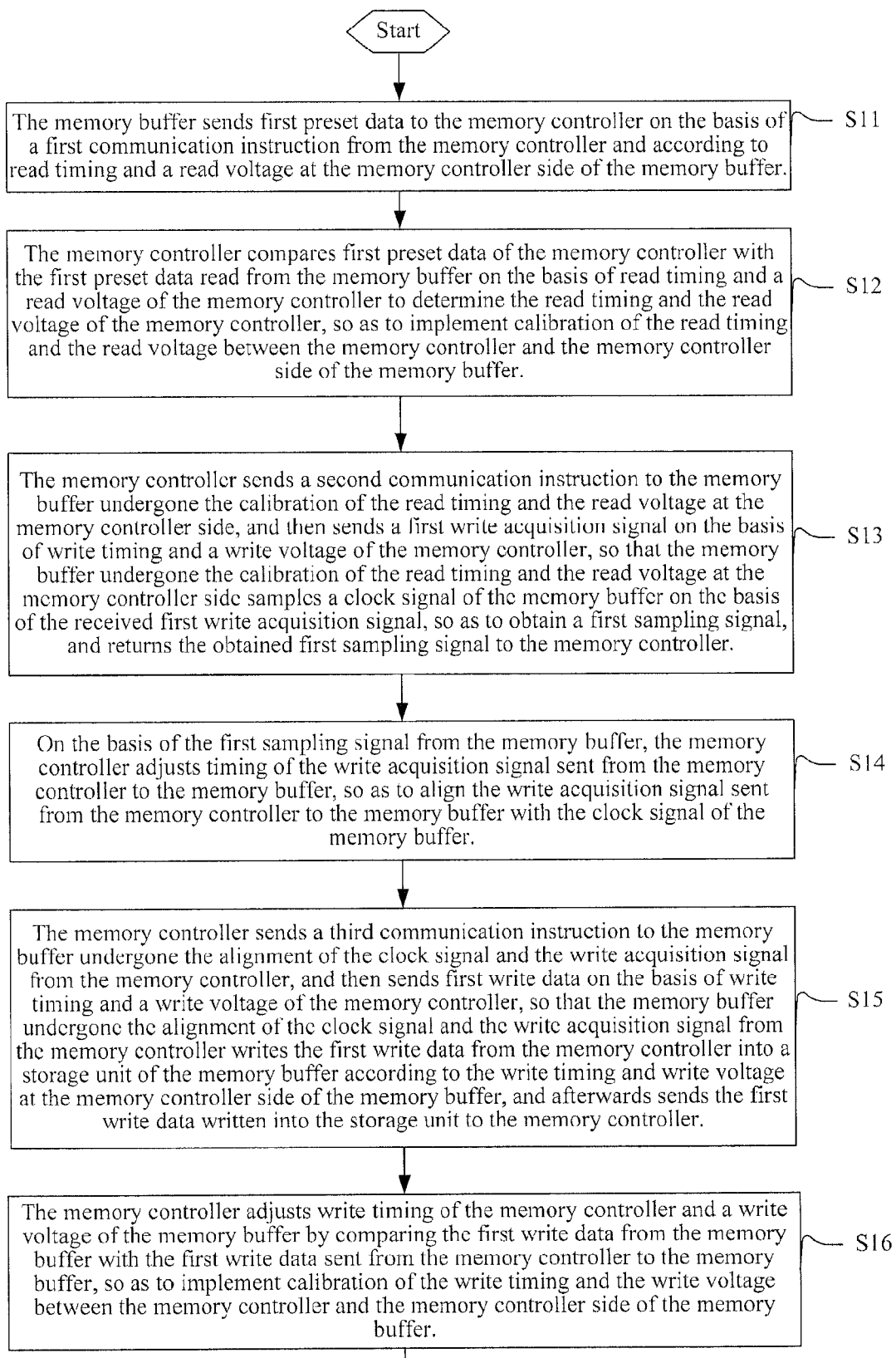
FIG. 4 is a preferred flow chart of a voltage and timing calibration method used in a memory system consistent with the present invention.
Figure 4B:
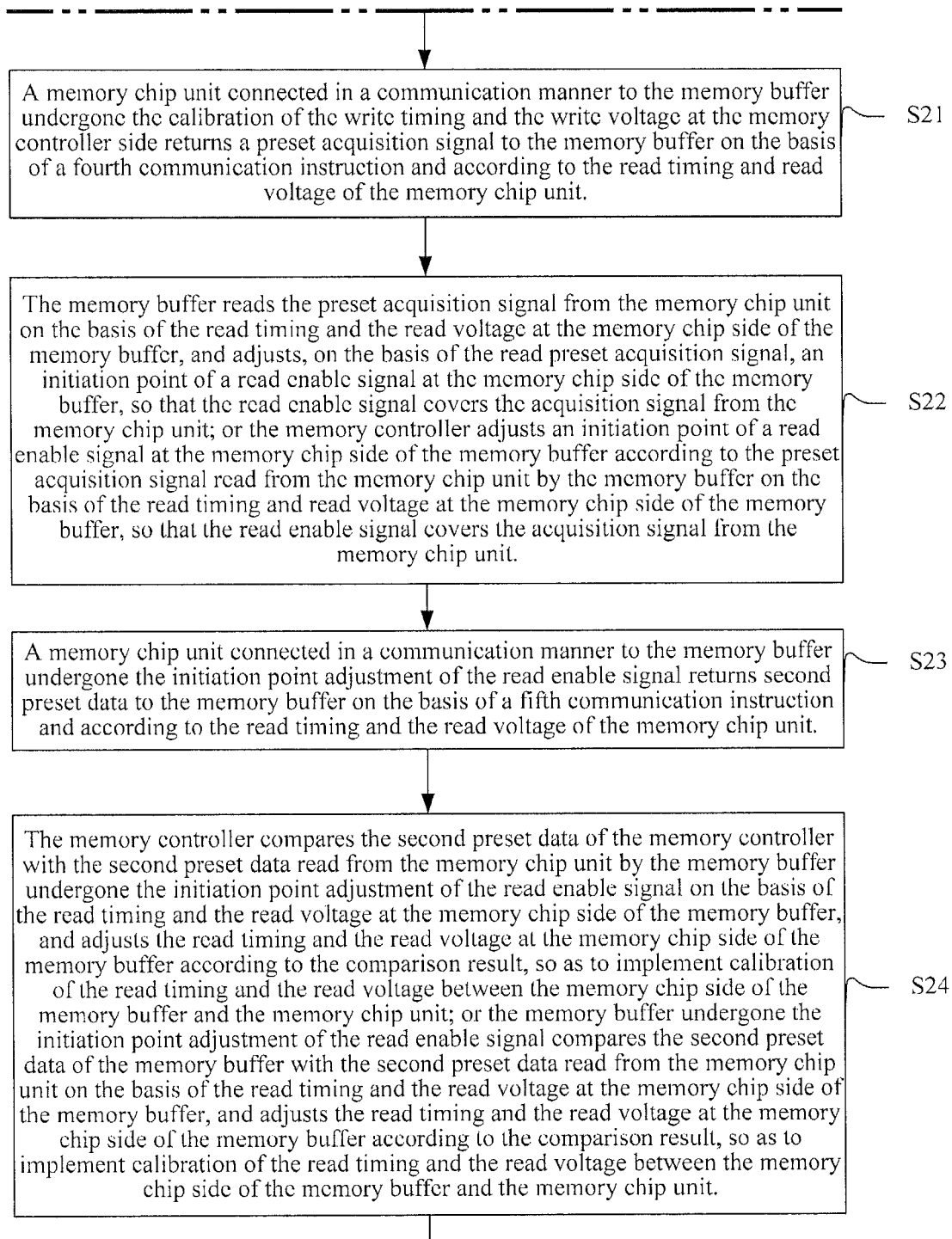
Figure 4C:
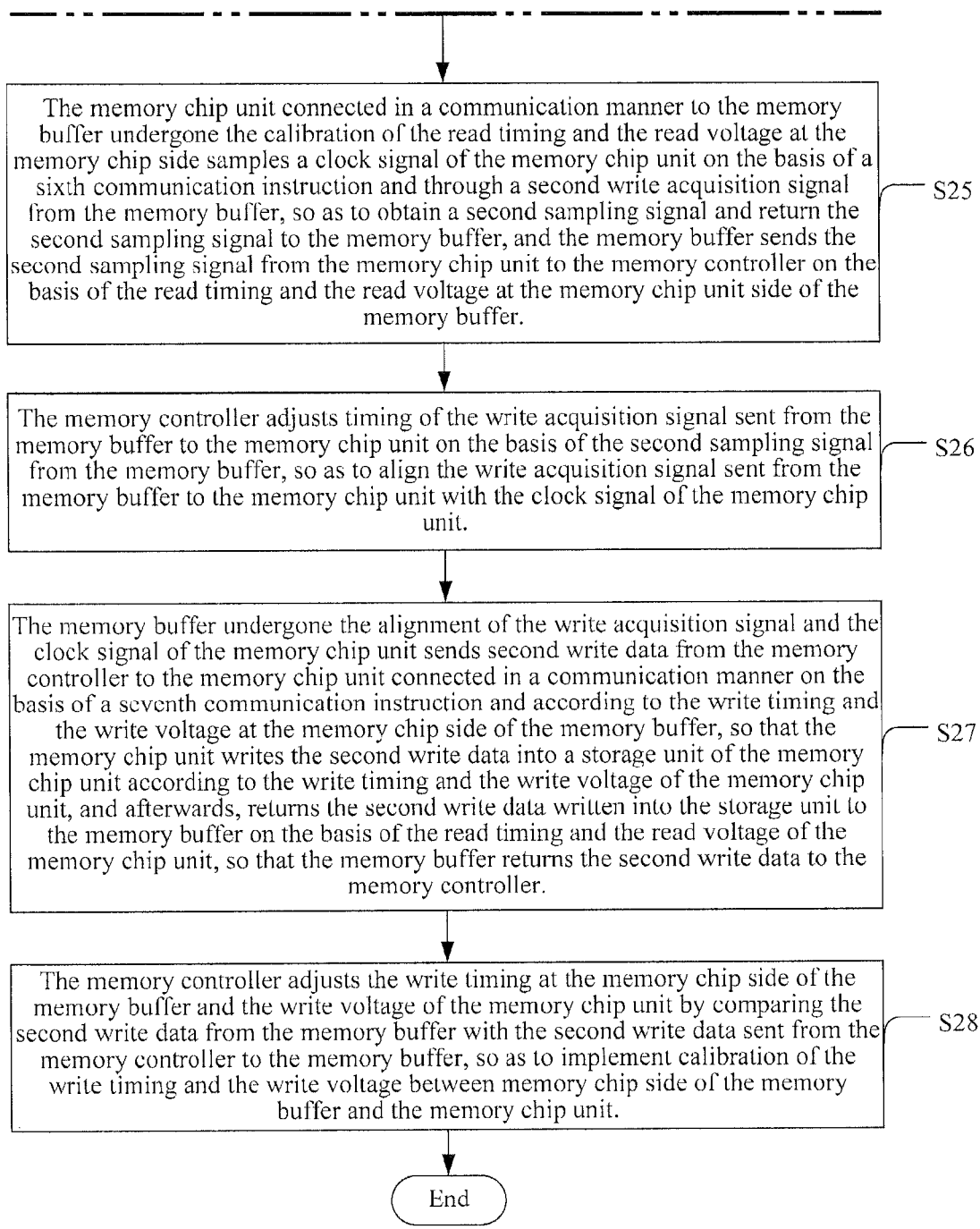
Figure 5:
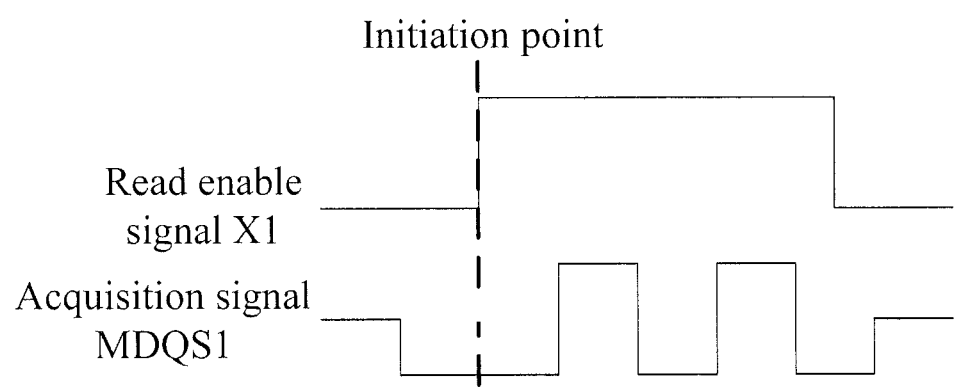
FIG. 5 is a schematic view illustrating a read enable signal calibrated through the voltage and timing calibration method used in a memory system consistent with the present invention.

Referring to FIG. 3 to FIG. 5, it should be noted that, the drawings provided in the embodiment merely exemplarily describes a basic concept of the present invention, so components related to the present invention are merely shown in the drawings, but are not drawn according to the numbers, shapes and sizes of the components in actual implementation. The shapes, the numbers and the sizes of the components can be randomly changed in the actual implementation, and a layout type of the components may be more complicated.

As shown in FIG. 3, the voltage and timing calibration method used in a memory system consistent with the present invention includes step S1 and step S2. The memory system includes a memory controller, multiple memory buffers connected to the memory controller in a communication manner, and multiple memory chip units connected to the memory buffers in a communication manner. The memory buffer includes, but is not limited to, a data buffer, a control buffer, or an all-around buffer integrating data buffering, control instruction buffering and address buffering.

The present invention is described in detail below by, for example, calibrating timing and voltages at a memory controller side of a memory buffer, and timing and voltages at a memory chip side of the memory buffer. On the basis of the calibration of the timing and the voltages at the memory controller side and at the memory chip side of one memory buffer, persons skilled in the art should understand calibration of the timing and the voltages at the memory controller side and at the memory chip side of more than one memory buffers.

In steps S1, the memory controller adjusts timing and voltages of the memory controller and voltages of the memory buffer according to data returned by the memory buffer on the basis of timing and voltages at the memory controller side of the memory buffer, so as to implement calibration of the timing and the voltage between the memory controller and the memory controller side of the memory buffer. The calibration process will be described in detail in steps S11 to S16 shown in FIG. 4A.

Afterwards, in step S2, according to data read from the memory chip unit by the memory buffer undergone the calibration of the timing and the voltage at the memory controller side on the basis of timing and a voltage at the memory chip side of the memory buffer, the memory controller adjusts the timing and the voltage at the memory chip side of the memory buffer, and a voltage of the memory chip unit, so as to implement calibration of the timing and the voltage between the memory chip side of the memory buffer and the memory chip unit connected in a communication manner; or the memory buffer undergone the calibration of the timing and the voltage at the memory controller side adjusts timing and a voltage at a memory chip side of the memory controller, and a voltage of the memory chip unit according to data read from the memory chip unit on the basis of the timing and the voltage at the memory chip side of the memory buffer, so as to implement calibration of the timing and the voltage between the memory chip side of the memory buffer and the memory chip unit connected in a communication manner. The calibration process will be described in detail in steps S21 to S28 shown in FIG. 4B-4C.

FIGS. 4A-4C is a preferred flow chart of a voltage and timing calibration method used in a memory system consistent with the present invention.

In step S11, the memory buffer sends first preset data to the memory controller on the basis of a first communication instruction from the memory controller and according to read timing and a read voltage at the memory controller side of the memory buffer.

The first communication instruction includes any instruction capable of informing the memory buffer of sending the first preset data to the memory controller. Preferably, the first communication instruction is an instruction enabling a data buffer to enter a Multi Purpose Register (MPR) mode. The first preset data is pre-determined on the basis of a communication protocol between the memory buffer and the memory controller.

For example, after receiving the first communication instruction from the memory controller, the memory buffer enters an MPR mode. Afterwards, an MPR control circuit in the data buffer places the first preset data into a First In First Out (FIFO) unit in the data buffer, and when receiving a read command from the memory controller again, the data buffer sends the first preset data in the FIFO unit to the memory controller through an acquisition signal line DQS and a data signal line DQ connected to the memory controller.

Then, in step S12, the memory controller compares first preset data of the memory controller with the first preset data read from the memory buffer on the basis of read timing and the read voltage of the memory controller to determine the read timing and the read voltage of the memory controller, so as to implement calibration of the read timing and the read voltage between the memory controller and the memory controller side of the memory buffer.

Specifically, the memory controller reads the first preset data from the memory buffer on the basis of the different read timing and read voltages of the memory controller, and compares the first preset data with first preset data stored in the memory controller, so as to determine a range of read timing and a read voltage capable of being read from the memory buffer, and further determine one set of read timing and read voltage in the determined range as the read timing and read voltage for calibration, thereby implementing the calibration of the read timing and the read voltage between the memory controller and the memory controller side of the memory buffer.

Afterwards, in step S13, the memory controller sends a second communication instruction to the memory buffer undergone the calibration of the read timing and the read voltage at the memory controller side, and then sends a first write acquisition signal on the basis of write timing and a write voltage of the memory controller, so that the memory buffer undergone the calibration of the read timing and the read voltage at the memory controller side samples a clock signal of the memory buffer on the basis of the received first write acquisition signal, so as to obtain a first sampling signal, and returns the first sampling signal to the memory controller.

The second communication instruction includes any instruction capable of informing the memory buffer of sampling the clock signal of the memory buffer on the basis of the subsequently received first write acquisition signal and returning the sampling result. Preferably, the second communication instruction is an instruction enabling the data buffer to enter a write leveling mode.

Preferably, the clock signal of the memory buffer is the clock signal sent from the memory controller through a clock signal line.

For example, the memory controller sends a second communication instruction to the memory buffer undergone the calibration of the read timing and the read voltage at a memory controller side, so that the memory buffer enters a write leveling mode, and then sends a first write acquisition signal to the memory buffer on the basis of the write timing and the write voltage of the memory controller. After the memory buffer receives the first write acquisition signal, the memory buffer samples the clock signal of the memory buffer respectively at a rising edge and/or a falling edge of the first write acquisition signal, so as to obtain a first sampling signal.

Then, in step S14, on the basis of the first sampling signal from the memory buffer, the memory controller adjusts timing of the write acquisition signal sent from the memory controller to the memory buffer, so as to align the write acquisition signal sent from the memory controller to the memory buffer with the clock signal of the memory buffer.

Specifically, if the first sampling signal is the data "1", it indicates that a phase of the first write acquisition signal is later than that of the clock signal of the memory buffer; and if the first sampling signal is the data "0", it indicates that a phase of the first write acquisition signal is earlier than that of the clock signal of the memory buffer. Therefore, on the basis of the first sampling signal from the memory buffer, the memory controller determines the alignment of the write acquisition signal sent from the memory controller to the memory buffer and the clock signal of the memory buffer at a boundary of the data "0" and "1" of the first sampling signal.

Afterwards, in step S15, the memory controller sends a third communication instruction to the memory buffer undergone the alignment of the clock signal and the write acquisition signal from the memory controller, and then sends first write data on the basis of write timing and a write voltage of the memory controller, so that the memory buffer undergone the alignment of the clock signal and the write acquisition signal from the memory controller writes the first write data from the memory controller into a storage unit of the memory buffer according to the write timing and write voltage at the memory controller side of the memory buffer, and afterwards sends the first write data written into the storage unit to the memory controller.

The third communication instruction includes any instruction capable of informing the memory buffer of receiving the first write data and returning the received first write data. Preferably, the third communication instruction is an instruction enabling the data buffer to enter a loop mode.

For example, the memory controller sends a third communication instruction to the memory buffer undergone the alignment of the clock signal and the write acquisition signal from the memory controller, so that the memory buffer enters a loop mode. Then, the memory controller first sends an indication signal of a write signal to the memory buffer, and then sends first write data to the memory buffer for many times according to the write voltage and different write timing of the memory controller. The memory buffer writes the subsequent first write data from the memory controller each time into a storage unit of the memory buffer on the basis of the write timing at the memory controller side of the memory buffer and the write voltage indicated by the received indication signal, and afterwards, returns the first write data written into the storage unit each time to the memory controller on the basis of a read command from the memory controller. Afterwards, the memory controller sends an indication signal of another write voltage to the memory buffer again, and then sends first write data to the memory buffer for many times according to the write voltage and different write timing of the memory controller. The memory buffer writes the subsequent first write data from the memory controller each time into a storage unit of the memory buffer on the basis of the write timing at the memory controller side of the memory buffer and the write voltage indicated by the indication signal received again. Such a process is repeated for many times.

Afterwards, in step S16, the memory controller adjusts write timing of the memory controller and a write voltage at the memory controller side of the memory buffer by comparing the first write data from the memory buffer with the first write data sent from the memory controller to the memory buffer, so as to implement calibration of the write timing and the write voltage between the memory controller and the memory controller side of the memory buffer.

Specifically, the memory controller compares the first write data from the memory buffer each time with the current first write data sent from the memory controller to the memory buffer, so as to determine a range of the write timing of the memory buffer and the write voltage at the memory controller side of the memory buffer enabling the memory buffer to correctly write the first write data, and further select one set of write timing and write voltage as the write timing and the write voltage for calibration in the determined range, thereby implementing the calibration of the write timing and the write voltage between the memory controller and the memory controller side of the memory buffer.

Then, in step 21, a memory chip unit connected in a communication manner to the memory buffer undergone the calibration of the write timing and the write voltage at the memory controller side returns a preset acquisition signal to the memory buffer on the basis of a fourth communication instruction and according to the read timing and read voltage of the memory chip unit.

The fourth communication instruction includes any instruction capable of informing the memory chip unit of sending the preset acquisition signal to the memory buffer. Preferably, when the fourth communication instruction is sent from the memory buffer, the fourth communication instruction is an instruction enabling the memory chip unit to enter an MPR mode; and when the fourth communication instruction is sent from the memory controller, the fourth communication instruction is an instruction enabling the memory buffer to enter a read calibration mode and enabling the memory chip unit to enter the MPR mode. The preset acquisition signal is pre-determined on the basis of a communication protocol between the memory chip unit and the memory controller or the memory buffer.

Afterwards, in step 22, the memory buffer reads the preset acquisition signal from the memory chip unit on the basis of the read timing and the read voltage at the memory chip side of the memory buffer, and adjusts, on the basis of the read preset acquisition signal, an initiation point of a read enable signal at the memory chip side of the memory buffer, so that the read enable signal covers the acquisition signal from the memory chip unit; or the memory controller adjusts an initiation point of a read enable signal at the memory chip side of the memory buffer according to the preset acquisition signal read from the memory chip unit by the memory buffer on the basis of the read timing and read voltage at the memory chip side of the memory buffer, so that the read enable signal covers the acquisition signal from the memory chip unit.

Specifically, the memory buffer samples the preset acquisition signal from the memory chip unit on the basis of the read timing and the read voltage at the memory chip side of the memory buffer, and if the sampling result is the data "1", it indicates that a phase of the read enable signal of the memory buffer is later than that of the preset acquisition signal; and if the sampling result is the data "0", it indicates that the phase of the read enable signal of the memory buffer is earlier than that of the preset acquisition signal. Therefore, the memory buffer or the memory controller adjusts the initiation point of the read enable signal of the memory buffer on the basis of the sampling result, so that the read enable signal covers the acquisition signal from the memory chip unit. For example, as shown in FIG. 5, the read enable signal X1 of the memory buffer covers the acquisition signal MDQS1 from the memory chip unit.

Then, in step 23, a memory chip unit connected in a communication manner to the memory buffer undergone the initiation point adjustment of the read enable signal returns second preset data to the memory buffer on the basis of a fifth communication instruction and according to the read timing and the read voltage of the memory chip unit.

The fifth communication instruction includes any instruction capable of informing the memory chip unit of sending the second preset data to the memory buffer. Preferably, when the fifth communication instruction is sent from the memory buffer, the fifth communication instruction is an instruction enabling the memory chip unit to enter an MPR mode; and when the fifth communication instruction is sent from the memory controller, the fifth communication instruction is an instruction enabling the memory buffer to enter a normal operating mode and enabling the memory chip unit to enter the MPR mode. The second preset data is pre-determined on the basis of a communication protocol between the memory chip unit and the memory controller or the memory buffer.

Afterwards, in step 24, the memory controller compares the second preset data of the memory controller with the second preset data read from the memory chip unit by the memory buffer undergone the initiation point adjustment of the read enable signal on the basis of the read timing and the read voltage at the memory chip side of the memory buffer, and adjusts the read timing and the read voltage at the memory chip side of the memory buffer according to the comparison result, so as to implement calibration of the read timing and the read voltage between the memory chip side of the memory buffer and the memory chip unit; or the memory buffer undergone the initiation point adjustment of the read enable signal compares the second preset data of the memory buffer with the second preset data read from the memory chip unit on the basis of the read timing and the read voltage at the memory chip side of the memory buffer, and adjusts the read timing and the read voltage at the memory chip side of the memory buffer according to the comparison result, so as to implement calibration of the read timing and the read voltage between the memory chip side of the memory buffer and the memory chip unit.

For example, the memory buffer undergone the initiation point adjustment of the read enable signal reads second preset data from the memory chip unit on the basis of different read timing and read voltages at the memory chip side of the memory buffer, returns each reading result to the memory controller so that the memory controller compares the data, determines, on the basis of the comparison result, a range of the read timing and the read voltage at the memory chip side of the memory buffer capable of correctly reading the data from the memory chip unit, and further determines one set of read timing and read voltage in the determined range as the read timing and the read voltage for calibration at the memory chip side of the memory buffer.

For another example, the memory buffer undergone the initiation point adjustment of the read enable signal reads second preset data from the memory chip unit on the basis of different read timing and read voltages at the memory chip side of the memory buffer, compares each reading result with the second preset data stored in the memory buffer, determines, on the basis of the comparison result, a range of the read timing and the read voltage at the memory chip side of the memory buffer capable of correctly reading the data from the memory chip unit, and further determines one set of read timing and read voltage in the determined range as the read timing and the read voltage for calibration at the memory chip side of the memory buffer.

Then, in step 25, the memory chip unit connected in a communication manner to the memory buffer undergone the calibration of the read timing and the read voltage at the memory chip side samples a clock signal of the memory chip unit on the basis of a sixth communication instruction and through a second write acquisition signal from the memory buffer, so as to obtain a second sampling signal and return the second sampling signal to the memory buffer, and the memory buffer sends the second sampling signal from the memory chip unit to the memory controller on the basis of the read timing and the read voltage at the memory chip unit side of the memory buffer.

The sixth communication instruction includes any instruction capable of informing the memory chip unit of sampling the clock signal of the memory chip unit through the subsequently received second write acquisition signal. Preferably, when the sixth communication instruction is sent from the memory buffer, the sixth communication instruction is an instruction enabling the memory chip unit to enter a write leveling mode; and when the sixth communication instruction is sent from the memory controller, the sixth communication instruction is an instruction enabling the memory buffer to enter a write calibration mode and enabling the memory chip unit to enter the write leveling mode.

Preferably, the clock signal of the memory chip unit is a clock signal sent from the memory buffer through the clock signal line, and the second write acquisition signal of the memory buffer is sent from the memory controller.

For example, the memory controller sends a sixth communication instruction to the memory buffer undergone the calibration of the read timing and the read voltage at the memory chip side, so that the memory buffer enters a write calibration mode. Meanwhile, the memory buffer sends the sixth communication instruction to the memory chip unit connected in a communication manner, so that the memory chip unit enters a write leveling mode. Then, the memory controller sends a second write acquisition signal to the memory buffer in the write calibration mode, so that the memory buffer sends the second write acquisition signal to the memory chip unit in the write leveling mode. Afterwards, the memory chip unit samples the clock signal of the memory chip unit through the received second write acquisition signal, so as to obtain a second sampling signal, and a corresponding memory buffer sends the second sampling signal from the memory chip unit to the memory controller on the basis of the read timing and the read voltage at the memory chip unit side of the memory buffer.

Then, in step 26, the memory controller adjusts timing of the write acquisition signal sent from the memory buffer to the memory chip unit on the basis of the second sampling signal from the memory buffer, so as to align the write acquisition signal sent from the memory buffer to the memory chip unit with the clock signal of the memory chip unit.

Specifically, if the second sampling signal is the data "1", it indicates that a phase of the second write acquisition signal is later than that of the clock signal of the memory chip unit; and if the second sampling signal is the data "0", it indicates that a phase of the second write acquisition signal is earlier than that of the clock signal of the memory chip unit. Therefore, on the basis of the second sampling signal from the memory buffer, the memory controller determines the alignment of the write acquisition signal sent from the memory buffer to the memory chip unit and the clock signal of the memory chip unit at a boundary of the data "0" and "1" of the second sampling signal.

Afterwards, in step 27, the memory buffer undergone the alignment of the write acquisition signal and the clock signal of the memory chip unit sends second write data from the memory controller to the memory chip unit connected in a communication manner on the basis of a seventh communication instruction and according to the write timing and the write voltage at the memory chip side of the memory buffer, so that the memory chip unit writes the second write data into a storage unit of the memory chip unit according to the write timing and the write voltage of the memory chip unit, and afterwards, returns the second write data written into the storage unit to the memory buffer on the basis of the read timing and the read voltage of the memory chip unit, so that the memory buffer returns the second write data to the memory controller.

The seventh communication instruction includes any instruction capable of informing the memory buffer and the memory chip unit of writing the data. Preferably, the seventh communication instruction is sent from the memory controller, and is an instruction enabling the memory buffer and the memory chip unit to enter a normal operating mode.

For example, the memory controller sends a seventh communication instruction to the memory buffer undergone the alignment of the write acquisition signal and the clock signal of the memory chip unit, so that the memory buffer enters a normal operating mode. Meanwhile, the memory buffer sends the seventh communication instruction to the memory chip unit connected in a communication manner to the memory buffer, so that the memory chip unit also enters a normal operating mode. Then, the memory controller first sends an indication signal of a write voltage to the memory chip through the memory buffer, and then sends second write data to the memory buffer. The memory buffer sends the second write data from the memory controller to the memory chip unit in the normal operating mode on the basis of the write voltage and different write timing at the memory chip side of the memory buffer. The memory chip unit writes the subsequent second write data from the memory buffer each time into a storage unit of the memory chip unit on the basis of a write voltage indicated by the received indication signal, and then returns the second write data written into the storage unit each time to the memory buffer on the basis of a read command forwarded by the memory buffer from the memory controller, and finally, the memory buffer forwards the second write data to the memory controller. Afterwards, the memory controller sends an indication signal of another write voltage to the memory chip through the memory buffer, and then sends second write data to the memory buffer. The memory buffer sends the second write data from the memory controller to the memory chip unit in a normal operating mode on the basis of the write voltage and different write timing at the memory chip side of the memory buffer. The memory chip unit writes the subsequent second write data from the memory buffer each time into a storage unit of the memory chip unit on the basis of a write voltage indicated by the received indication signal, and then returns the second write data written into the storage unit each time to the memory buffer on the basis of a read command forwarded by the memory buffer from the memory controller, and finally, the memory buffer forwards the second write data to the memory controller. Such a process is repeated for many times.

Then, in step 28, the memory controller adjusts the write timing at the memory chip side of the memory buffer and the write voltage of the memory chip unit by comparing the second write data from the memory buffer with the second write data sent from the memory controller to the memory buffer, so as to implement calibration of the write timing and the write voltage between memory chip side of the memory buffer and the memory chip unit.

Specifically, the memory controller compares the second write data from the memory buffer each time with the current second write data sent from the memory controller to the memory buffer, so as to determine a range of the write timing at the memory chip side of the memory buffer and the write voltage of the memory controller unit enabling the memory chip unit to correctly write the second write data, and further select one set of write timing and write voltage as the write timing and the write voltage for calibration in the determined range, thereby implementing the calibration of the write timing and the write voltage between the memory chip side of the memory buffer and the memory chip unit.

It should be noted that, persons skilled in the art should understand that the embodiment shown in FIG. 4 is merely a preferred implementation, and is not intended to limit the present invention. Actually, the steps are not sequentially performed. For example, after the calibration of the read timing and the read voltage between the memory controller and the memory controller side of the memory buffer is implemented through a manner not described in the steps S11 and S12, the steps S13 and S14 may be executed. For another example, after the alignment of the write acquisition signal sent from the memory controller to the memory buffer and the clock signal of the memory buffer is implemented through a manner not described in the steps S13 and S14, the steps S15 and S16 may be executed. For still another example, after the calibration of the write timing and the write voltage between the memory controller and the memory controller side of the memory buffer is implemented through a manner not described in the steps S15 and S16, the steps S21 and S22 may be executed. For still another example, after the adjustment of the initiation point of the read enable signal of the memory buffer is implemented through a manner not described in the steps S21 and S22, the steps S23 and S24 may be executed. For still another example, after the calibration of the read timing and the read voltage between the memory chip side of the memory buffer and the memory chip unit is implemented through a manner not described in the steps S23 and S24, the steps S25 and S26 may be executed. For yet another example, after the alignment of the write acquisition signal sent from the memory buffer to the memory chip unit and the clock signal of the memory chip unit is implemented through a manner not described in the steps S25 and S26, the steps S27 and S28 may be executed.

To sum up, through the voltage and time calibration method used in the memory system, after completing the calibration of the timing and the voltage between the memory controller and the memory controller side of the memory buffer, the memory controller controls the calibration of the timing and the voltage between the memory chip side of the memory buffer and the corresponding memory chip unit, which can partially even fully save a signal generation unit disposed in the memory buffer currently, thereby effectively saving hardware resources of the memory buffer, simplifying the circuit of the memory buffer, and shortening a design period of the circuit. Therefore, the present invention effectively overcomes the disadvantages in the prior art, and has a highly industrial value in use.

The description of the above embodiments is only to illustrate the principle and effect of the present invention, but is not intended to limit the present invention. Any persons skilled in the art can make modification or variation to the above embodiments without departing from the spirit and scope of the present invention. Therefore, any modification or variation made without departing from the spirit and technical concept of the present invention by persons with ordinary skill in the art is intended to be included within the scope of the claims.

What is claimed is:

1. A voltage and timing calibration method used in a memory system, wherein the memory system comprises a memory controller, at least one memory buffer connected to the memory controller in a communication manner, and at least one memory chip unit connected to the memory buffer in a communication manner, the method at least comprising:
   1) the memory controller adjusting timing and voltages of the memory controller and voltages of the memory buffer according to first data returned by the memory buffer, the first data corresponding to a timing and a voltage at a memory controller side of the memory buffer, to implement calibration of the timing and the voltage between the memory controller and the memory controller side of the memory buffer; and
   2) according to second data read from the memory chip unit by the memory buffer undergone the calibration of the timing and the voltage at the memory controller side based on timing and voltages at a memory chip side of the memory buffer, the memory controller adjusting (i) the timing and the voltage at the memory chip side of the memory buffer, and (ii) the voltage of the memory chip unit, to implement calibration of the timing and the voltages between the memory chip side of the memory buffer and the memory chip unit connected thereto in a communication manner.

2. The voltage and timing calibration method used in a memory system as in claim 1, wherein step 1) comprises:
   the memory buffer sending first preset data to the memory controller based on a first communication instruction from the memory controller and according to a read timing and a read voltage at the memory controller side of the memory buffer; and
   the memory controller comparing first preset data of the memory controller with the first preset data read from the memory buffer based on the read timing and the read voltage of the memory controller to determine the read timing and the read voltage of the memory controller, to implement calibration of the read timing and the read voltage between the memory controller and the memory controller side of the memory buffer.

3. The voltage and timing calibration method used in a memory system as in claim 1, wherein step 1) comprises:
   the memory controller sending a second communication instruction to the memory buffer undergone the calibration of the read timing and the read voltage at the memory controller side, and then sending a first write acquisition signal based on a write timing and a write voltage of the memory controller, so that the memory buffer undergone the calibration of the read timing and the read voltage at the memory controller side samples a clock signal of the memory buffer based on the received first write acquisition signal, to obtain a first sampling signal and return the first sampling signal to the memory controller; and
   the memory controller, based on the first sampling signal from the memory buffer, adjusting timing of the write acquisition signal sent from the memory controller to the memory buffer, to align the write acquisition signal sent from the memory controller to the memory buffer with the clock signal of the memory buffer.

4. The voltage and timing calibration method used in a memory system as in claim 1, wherein step 1) comprises:
   the memory controller (i) sending a third communication instruction to the memory buffer undergone the alignment of the clock signal and the write acquisition signal from the memory controller, and then (ii) sending first write data based on write a timing and a write voltage of the memory controller, so that the memory buffer undergone the alignment of the clock signal and the write acquisition signal from the memory controller writes the first write data from the memory controller into a storage unit of the memory buffer according to write timing and the write voltage at the memory controller side of the memory buffer, and afterwards (iii) sends the first write data written into the storage unit to the memory controller; and
   the memory controller adjusting write timing of the memory controller and the write voltage of the memory buffer by comparing the first write data from the memory buffer with the first write data sent from the memory controller to the memory buffer, to implement calibration of the write timing and the write voltage between the memory controller and the memory controller side of the memory buffer.

5. The voltage and timing calibration method used in a memory system as in claim 1, wherein step 2) comprises:
   a memory chip unit connected in a communication manner to the memory buffer undergone the calibration of the write timing and the write voltage at the memory controller side returning a preset acquisition signal to the memory buffer based on a fourth communication instruction and according to a read timing and a read voltage of the memory chip unit; and
   the memory controller adjusting an initiation point of a read enable signal at the memory chip side of the memory buffer according to the preset acquisition signal read from the memory chip unit by the memory buffer based on the read timing and the read voltage at the memory chip side of the memory buffer, so that the read enable signal covers the acquisition signal from the memory chip unit.

6. The voltage and timing calibration method used in a memory system as in claim 1, wherein step 2) comprises:
a memory chip unit connected in a communication manner to the memory buffer undergone the initiation point adjustment of the read enable signal returning second preset data to the memory buffer based on a fifth communication instruction and according to a read timing and a read voltage of the memory chip unit; and
the memory controller (i) comparing the second preset data of the memory controller with the second preset data read from the memory chip unit by the memory buffer undergone the initiation point adjustment of the read enable signal based on the read timing and the read voltage at the memory chip side of the memory buffer to obtain a first comparison result, and (ii) adjusting the read timing and the read voltage at the memory chip side of the memory buffer according to the firsts comparison result, to implement calibration of the read timing and the read voltage between the memory chip side of the memory buffer and the memory chip unit.

7. The voltage and timing calibration method used in a memory system as in claim 1, wherein step 2) comprises:
the memory chip unit connected in a communication manner to the memory buffer undergone the calibration of the read timing and the read voltage at the memory chip side sampling the clock signal of the memory chip unit based on a sixth communication instruction and through a second write acquisition signal from the memory buffer, to obtain a second sampling signal and return the second sampling signal to the memory buffer, and the memory buffer sending the second sampling signal from the memory chip unit to the memory controller based on the read timing and the read voltage at the memory chip unit side of the memory buffer; and
the memory controller adjusting timing of the write acquisition signal sent from the memory buffer to the memory chip unit based on the second sampling signal from the memory buffer, to align the write acquisition signal sent from the memory buffer to the memory chip unit with the clock signal of the memory chip unit.

8. The voltage and timing calibration method used in a memory system as in claim 1, wherein step 2) comprises:
the memory buffer undergone the alignment of the write acquisition signal and the clock signal of the memory chip unit sending second write data from the memory controller to the memory chip unit connected in a communication manner based on a seventh communication instruction and according to a write timing and the write voltage at the memory chip side of the memory buffer, so that the memory chip unit writes the second write data into a storage unit of the memory chip unit based on the write timing and the write voltage of the memory chip unit, and afterwards, returns the second write data written into the storage unit to the memory buffer based on the read timing and the read voltage of the memory chip unit, so that the memory buffer returns the second write data to the memory controller; and
the memory controller adjusting write timing at the memory chip side of the memory buffer and the write voltage of the memory chip unit by comparing the second write data from the memory buffer with the second write data sent from the memory controller to the memory buffer, to implement calibration of a write timing and a write voltage between memory chip side of the memory buffer and the memory chip unit.

9. The voltage and timing calibration method used in a memory system as in claim 1, wherein the memory buffer comprises one of a data buffer, a control buffer, or an all-around buffer integrating data buffering, control instruction buffering and address buffering.

10. A voltage and timing calibration method used in a memory system, wherein the memory system comprises a memory controller, at least one memory buffer connected to the memory controller in a communication manner, and at least one memory chip unit connected to the memory buffer in a communication manner, the method at least comprising:
1) the memory controller adjusting timing and voltages of the memory controller and voltages of the memory buffer according to first data returned by the memory buffer, the first data corresponding to a timing and a voltage at a memory controller side of the memory buffer, to implement calibration of the timing and the voltage between the memory controller and the memory controller side of the memory buffer; and
2) according to second data read from the memory chip unit by the memory buffer undergone the calibration of the timing and the voltage at the memory controller side based on timing and voltages at a memory chip side of the memory buffer, the memory buffer undergone the calibration of the timing and the voltage at the memory controller side adjusting (i) timing and voltages at a memory chip side of the memory buffer, and (ii) the voltage of the memory chip unit according to the second data read from the memory chip unit based on the timing and the voltage at the memory chip side of the memory buffer, to implement calibration of the timing and the voltages between the memory chip side of the memory buffer and the memory chip unit connected thereto in a communication manner.

11. The voltage and timing calibration method used in a memory system as in claim 10, wherein step 1) comprises:
the memory buffer sending first preset data to the memory controller based on a first communication instruction from the memory controller and according to a read timing and a read voltage at the memory controller side of the memory buffer; and
the memory controller comparing first preset data of the memory controller with the first preset data read from the memory buffer based on the read timing and the read voltage of the memory controller to determine the read timing and the read voltage of the memory controller, to implement calibration of the read timing and the read voltage between the memory controller and the memory controller side of the memory buffer.

12. The voltage and timing calibration method used in a memory system as in claim 10, wherein step 1) comprises:
the memory controller sending a second communication instruction to the memory buffer undergone the calibration of the read timing and the read voltage at the memory controller side, and then sending a first write acquisition signal based on a write timing and a write voltage of the memory controller, so that the memory buffer undergone the calibration of the read timing and the read voltage at the memory controller side samples a clock signal of the memory buffer based on the received first write acquisition signal, to obtain a first sampling signal and return the first sampling signal to the memory controller; and
the memory controller, based on the first sampling signal from the memory buffer, adjusting timing of the write acquisition signal sent from the memory controller to the memory buffer, to align the write acquisition signal sent from the memory controller to the memory buffer with the clock signal of the memory buffer.

13. The voltage and timing calibration method used in a memory system as in claim 10, wherein step 1) comprises:
the memory controller (i) sending a third communication instruction to the memory buffer undergone the alignment of the clock signal and the write acquisition signal from the memory controller, and then (ii) sending first write data based on write a timing and a write voltage of the memory controller, so that the memory buffer undergone the alignment of the clock signal and the write acquisition signal from the memory controller writes the first write data from the memory controller into a storage unit of the memory buffer according to write timing and the write voltage at the memory controller side of the memory buffer, and afterwards (iii) sends the first write data written into the storage unit to the memory controller; and
the memory controller adjusting write timing of the memory controller and the write voltage of the memory buffer by comparing the first write data from the memory buffer with the first write data sent from the memory controller to the memory buffer, to implement calibration of the write timing and the write voltage between the memory controller and the memory controller side of the memory buffer.

14. The voltage and timing calibration method used in a memory system as in claim 10, wherein step 2) comprises:
a memory chip unit connected in a communication manner to the memory buffer undergone the calibration of the write timing and the write voltage at the memory controller side returning a preset acquisition signal to the memory buffer based on a fourth communication instruction and according to a read timing and a read voltage of the memory chip unit; and
the memory buffer (i) reading the preset acquisition signal from the memory chip unit based on the read timing and the read voltage at the memory chip side of the memory buffer, and (ii) adjusting, based on the read preset acquisition signal, an initiation point of a read enable signal at the memory chip side of the memory buffer, so that the read enable signal covers the acquisition signal from the memory chip unit.

15. The voltage and timing calibration method used in a memory system as in claim 10, wherein step 2) comprises:
a memory chip unit connected in a communication manner to the memory buffer undergone the initiation point adjustment of the read enable signal returning second preset data to the memory buffer based on a fifth communication instruction and according to a read timing and a read voltage of the memory chip unit; and
the memory buffer undergone the initiation point adjustment of the read enable signal (i) comparing the second preset data of the memory buffer with the second preset data read from the memory chip unit based on the read timing and the read voltage at the memory chip side of the memory buffer to obtain a second comparison result, buffer, and (ii) adjusting the read timing and the read voltage at the memory chip side of the memory buffer according to the second comparison result, to implement calibration of the read timing and the read voltage between the memory chip side of the memory buffer and the memory chip unit.

16. The voltage and timing calibration method used in a memory system as in claim 10, wherein step 2) comprises:
the memory chip unit connected in a communication manner to the memory buffer undergone the calibration of the read timing and the read voltage at the memory chip side sampling the clock signal of the memory chip unit based on a sixth communication instruction and through a second write acquisition signal from the memory buffer, to obtain a second sampling signal and return the second sampling signal to the memory buffer, and the memory buffer sending the second sampling signal from the memory chip unit to the memory controller based on the read timing and the read voltage at the memory chip unit side of the memory buffer; and
the memory controller adjusting timing of the write acquisition signal sent from the memory buffer to the memory chip unit based on the second sampling signal from the memory buffer, to align the write acquisition signal sent from the memory buffer to the memory chip unit with the clock signal of the memory chip unit.

17. The voltage and timing calibration method used in a memory system as in claim 10, wherein step 2) comprises:
the memory buffer undergone the alignment of the write acquisition signal and the clock signal of the memory chip unit sending second write data from the memory controller to the memory chip unit connected in a communication manner based on a seventh communication instruction and according to a write timing and the write voltage at the memory chip side of the memory buffer, so that the memory chip unit writes the second write data into a storage unit of the memory chip unit based on the write timing and the write voltage of the memory chip unit, and afterwards, returns the second write data written into the storage unit to the memory buffer based on the read timing and the read voltage of the memory chip unit, so that the memory buffer returns the second write data to the memory controller; and
the memory controller adjusting write timing at the memory chip side of the memory buffer and the write voltage of the memory chip unit by comparing the second write data from the memory buffer with the second write data sent from the memory controller to the memory buffer, to implement calibration of a write timing and a write voltage between memory chip side of the memory buffer and the memory chip unit.

18. The voltage and timing calibration method used in a memory system as in claim 10, wherein the memory buffer comprises one of a data buffer, a control buffer, or an all-around buffer integrating data buffering, control instruction buffering and address buffering.

* * * * *